United States Patent
Van Syckel et al.

(10) Patent No.: US 11,347,700 B2
(45) Date of Patent: May 31, 2022

(54) SERVICE DEFINITIONS ON MODELS FOR DECOUPLING SERVICES FROM DATABASE LAYERS

(71) Applicant: SAP SE, Walldorf (DE)

(72) Inventors: Sebastian Van Syckel, Mannheim (DE); Wolfram Kleis, Bad Schönborn (DE); Nico Haller, Heidelberg (DE)

(73) Assignee: SAP SE, Walldorf (DE)

( * ) Notice: Subject to any disclaimer, the term of this patent is extended or adjusted under 35 U.S.C. 154(b) by 382 days.

(21) Appl. No.: 16/537,141

(22) Filed: Aug. 9, 2019

(65) Prior Publication Data

US 2021/0042276 A1    Feb. 11, 2021

(51) Int. Cl.
*G06F 16/21*     (2019.01)
*G06F 16/953*    (2019.01)
*G06F 21/62*     (2013.01)
*G06F 9/54*      (2006.01)

(52) U.S. Cl.
CPC .............. *G06F 16/212* (2019.01); *G06F 9/54* (2013.01); *G06F 16/953* (2019.01); *G06F 21/6218* (2013.01)

(58) Field of Classification Search
None
See application file for complete search history.

(56) References Cited

U.S. PATENT DOCUMENTS

| | | | |
|---|---|---|---|
| 2019/0188314 A1* | 6/2019 | Mirizzi | G06F 16/285 |
| 2020/0005744 A1* | 1/2020 | Godunov | G10H 1/0025 |
| 2020/0133744 A1* | 4/2020 | MacLeod | G06V 30/1985 |
| 2020/0167871 A1* | 5/2020 | Basu | G06Q 20/14 |
| 2021/0042276 A1* | 2/2021 | Van Syckel | G06F 21/6218 |
| 2021/0211509 A1* | 7/2021 | Ly | H04W 4/70 |
| 2021/0358121 A1* | 11/2021 | Bangia | A61B 5/4238 |

OTHER PUBLICATIONS

Microsoft, "Entity Data Model: Primitive Data Types" Mar. 29, 2017, [retrieved on Aug. 9, 2019], retrieved from: URL <https://docs.microsoft.com/en-US/dotnet/framework/data/adonet/entity-data-model-primitive-data-types>, 3 pages.

(Continued)

*Primary Examiner* — Kim T Nguyen
(74) *Attorney, Agent, or Firm* — Fish & Richardson P.C.

(57) ABSTRACT

Methods, systems, and computer-readable storage media for receiving, in response to instantiation of an application that enables access to data within the database layer through a data model, an application programming interface (API) definition provided as a computer-readable file, the API definition being received API definitions store, processing the API definition to provide an entity type definition as a computer-readable file, the entity type definition being specific to the data model, processing the entity type definition to provide a service that enables access to data within the database layer through the data model during execution of the application, and hosting the service to enable access to the data within the database layer based on one or more queries submitted from a web client.

20 Claims, 6 Drawing Sheets

(56) References Cited

OTHER PUBLICATIONS

Oasis, "Odata Version 4.0 Part 3: Common Schema Definition Language (CSDL) Plus Errata 03" Jun. 2, 2016. [retrieved on Aug. 9, 2019], retrieved from: URL <http://docs.oasis-open.org/odata/odata/v4.0/errata03/os/complete/part3-csdl/odata-v4.0-errata03-os-part3-csdl-complete.html#_Toc453752491>, 80 pages.

Oasis, "Odata Version 4.01. Part 1: Protocol" Jan. 30, 2018, [retrieved on Aug. 9, 2019], retrieved from: URL <http://docs.oasis-open.org/odata/odata/v4.01/cs01/part1-protocol/odata-v4.01-cs01-part1-protocol.html#sec_DataModel>, 85 pages.

Wikipedia Contributors, "Object Relational Mapping" Retrieved on or before Apr. 20, 2019, via Internet Archive: Wayback Machine URL<http://web.archive.org/web/20190420073841/https://en.wikipedia.org/wiki/Object-relational_mapping>, [retrieved on Jul. 30, 2019], retrieved from: <https://en.wikipedia.org/wiki/Object-relational_mapping>, 4 pages.

Wikipedia Contributors, "Open Data Protocol" retrieved on or before Mar. 21, 2019, via Internet Archive: Wayback Machine URL <http://web.archive.org/web/20190321101904/https://en.wikipedia.org/wiki/Open_Data_Protocol>, [retrieved on Jul. 30, 2019], retrieved from: <https://en.wikipedia.org/wiki/Open_Data_Protocol>, 7 pages.

\* cited by examiner

```
{
  "name": "EntityA",
  "description": "<entity_description>",
  "model": "modelA",
  "quota": "<Number>/${<environment_variable>},
  "restrictions": {
    "creatable": true,
    "updatable": false,
    "deletable": {
      "<property_name/${<session_variable>}": {
        "$<operator>": "<String>/<Number>/<Array>/<Object>/$true/$false/
        $null/${<session_variable>}"
      }
    }
  },
  "language": {
    "create": "<ISO 639-1, i.e., the Alpha-2 code>",
    "update": "<ISO 639-1, i.e., the Alpha-2 code>",
    "read": "<ISO 639-1, i.e., the Alpha-2 code>",
  },
  "staticInclude": [
    {
      "association": "<association_of_base_model>",
      "attributes": ["<attribute>"]
    }
  ],
  "forceInnerJoin": true,
  "properties": {
    "key": "<property>",
    "Property1": {
      "source": "[<association_of_base_model>].<attribute>",
      "description": "<property_description>",
      "i18n": true,
      "searchable": true,
      "annotations": {
        "<property_annotation_term>": "<property_annotation_value>"
      }
    },
    "Property2": {
      "type": "<EdmType>",
      "description": "<property_description>",
      "annotations": {
        "<property_annotation_term>": "<property_annotation_value>"
      }
    },
```

*FIG. 3A*

```
{
  "conditions": {
    "read": {
      "<property_name>": {
        "$<operator>": "<String>/<Number>/<Array>/<Object>/$true/$false/
        $null/${<session_variable>}"
      }
    },
    "update": {
      "$and/$or": {
        "<property_name_1>": {
          "$<operator>": "<String>/<Number>/<Array>/<Object>/$true/$false/
          $null/${<session_variable>}"
        },
        "<property_name_2>": {
          "$<operator>": "<String>/<Number>/<Array>/<Object>/$true/$false/
          $null/${<session_variable>}"
        }
      }
    },
    "delete": {
      "$or": [
        {
          "<property_name_1>": {
            "$<operator>": "<String>/<Number>/<Array>/<Object>/$true/$false/
            $null/${<session_variable>}"
          }
        },
        {
          "<property_name_1>": {
            "$<operator>": "<String>/<Number>/<Array>/<Object>/$true/$false/
            $null/${<session_variable>}"
          }
        }
      ]
    }
  }
}
```

*FIG. 3B*

SERVICE DEFINITIONS ON MODELS FOR DECOUPLING SERVICES FROM DATABASE LAYERS

BACKGROUND

Web clients can be used to publish and/or edit data stored in a database layer. For example, a user can interact with a user interface displayed through a web client to view data and/or edit data provided within a database layer. In some instances, the web client accesses the database layer through one or more services provided as application programming interfaces (APIs).

In some instances, services are generated one-to-one from a data model. That is, each service is generated based on a respective data model. Such an approach, however, has several limitations. For example, the names of database artifacts may contain technical details (e.g., data types, versioning details) that should not be part of the corresponding service artifacts. As another example, some database artifacts are internal and should not be part of a service at all. As another example, changes to database artifacts would automatically result in undesired changes in the services that are generated based on thereon.

SUMMARY

Implementations of the present disclosure are directed to defining customized services based on data models. More particularly, implementations of the present disclosure are directed to leveraging a data model to provide customization of data schemas and data handling behaviors in services that enable interactions between a web client and a database layer.

In some implementations, actions include receiving, in response to instantiation of an application that enables access to data within the database layer through a data model, an application programming interface (API) definition provided as a computer-readable file, the API definition being received API definitions store, processing the API definition to provide an entity type definition as a computer-readable file, the entity type definition being specific to the data model, processing the entity type definition to provide a service that enables access to data within the database layer through the data model during execution of the application, and hosting the service to enable access to the data within the database layer based on one or more queries submitted from a web client. Other implementations of this aspect include corresponding systems, apparatus, and computer programs, configured to perform the actions of the methods, encoded on computer storage devices.

These and other implementations can each optionally include one or more of the following features: processing the API definition to provide the entity type definition includes validating a format of an entity definition provided within the API definition based on a schema, retrieving the data model for the entity definition, and providing the entity type definition based on the entity definition and the data model; a service library processes the entity type definition to provide the service; the entity type definition includes structure defining elements that specify information associated with the data model; the entity type definition includes behavior defining elements that define actions executable by the service when accessing the database layer through the data model; the service is an Open Data Protocol (OData) service provided as a representative state transfer (REST) API; and the data model is an object-relational mapping (ORM) model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A and 3B depict an example pseudo-code schema for entity type definition in accordance with implementations of the present disclosure.

Like reference symbols in the various drawings indicate like elements.

DETAILED DESCRIPTION

Figure 1:
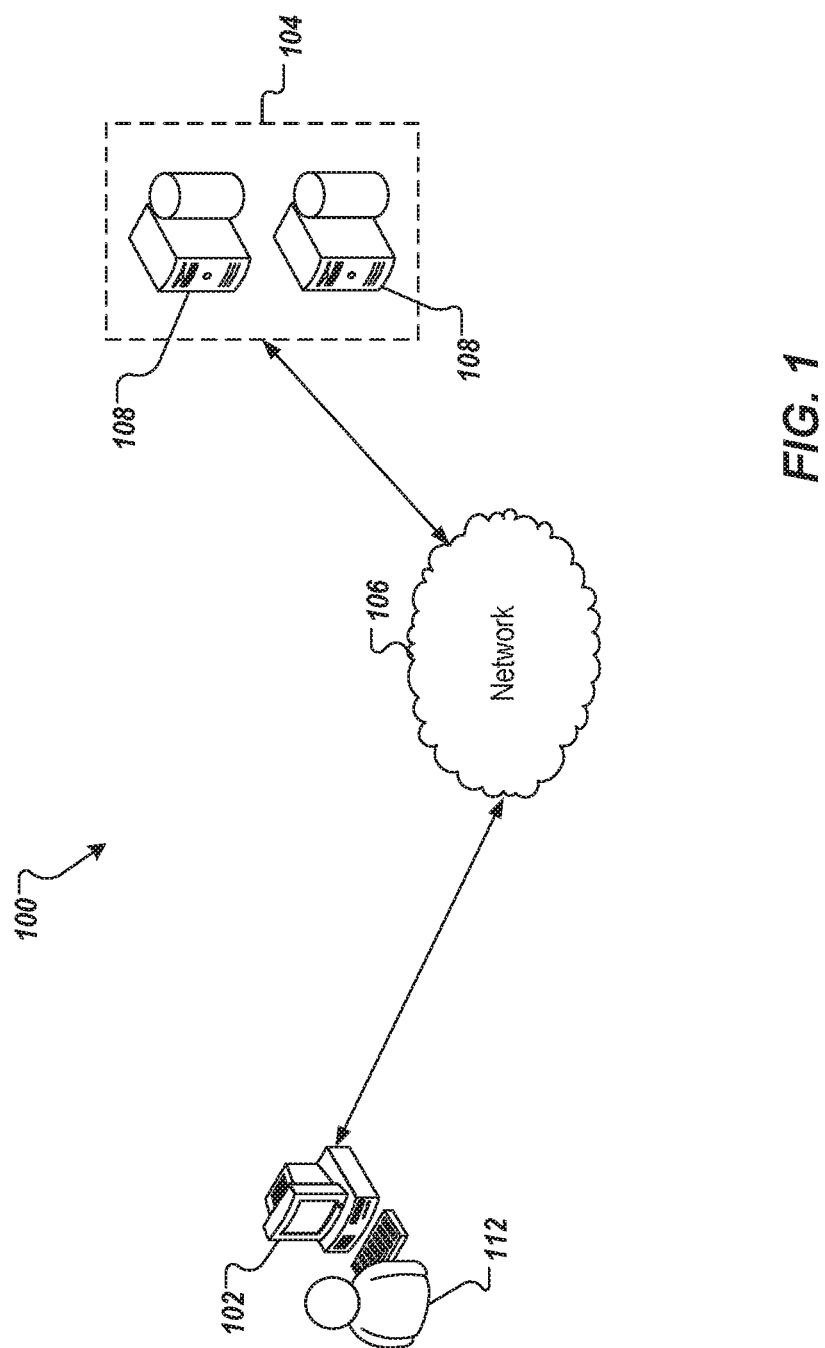
FIG. 1 depicts an example architecture that can be used to execute implementations of the present disclosure.

Implementations of the present disclosure are directed to defining customized services based on data models. More particularly, implementations of the present disclosure are directed to leveraging a data model to provide customization of data schemas and data handling behaviors in services that enable interactions between a web client and a database layer. Implementations can include actions of receiving, in response to instantiation of an application that enables access to data within the database layer through a data model, an application programming interface (API) definition provided as a computer-readable file, the API definition being received API definitions store, processing the API definition to provide an entity type definition as a computer-readable file, the entity type definition being specific to the data model, processing the entity type definition to provide a service that enables access to data within the database layer through the data model during execution of the application, and hosting the service to enable access to the data within the database layer based on one or more queries submitted from a web client.

Implementations of the present disclosure are described in further detail herein with reference to services provided based on the Open Data Protocol (OData). OData can be described as an open protocol that enables the generation and consumption of queryable and interoperable representative state transfer (REST)-ful application programming interfaces (APIs) in a standardized manner. More particularly, implementations of the present disclosure are described in further detail herein with reference to OData services, which are OData RESTful APIs. In some examples, and as discussed in further detail herein, web clients can use RESTful APIs to publish and edit resources (e.g., data) stored within a database layer. In some examples, the resources are identified using URLs and are defined in a data model. In some examples, resources are accessed using hypertext transfer protocol (HTTP) messages. OData services can be described in terms of an entity data model (EDM). In particular, a common schema definition language (CSDL) is used to define a representation (e.g., an extensible markup language (XML) representation) of a data model exposed by an OData service.

Implementations of the present disclosure are also described in further detail herein with reference to a data model provided as an object-relational mapping (ORM) model. In general, ORM can be described as a programming technique for converting data between incompatible type systems using object-oriented programming languages, which creates a virtual object database that can be used from within the programming language.

To provide further context for implementations of the present disclosure, and as introduced above, web clients can be used to publish and/or edit data stored in a database layer. For example, a user can interact with a user interface displayed through a web client to view data and/or edit data provided within a database layer. In some instances, the web client accesses the database layer through one or more services, such as OData services (RESTful APIs), described above.

In some instances, services are generated one-to-one from a data model. That is, each service is generated based on a respective data model. Such an approach, however, has several limitations. In some examples, limitations of such approaches are apparent in naming, masking, composition, and consistency. For example, the names of database artifacts may contain technical details (e.g., data types, versioning details) that should not be part of the corresponding service artifacts. As another example, some database artifacts are internal and should not be part of a service at all. As another example, changes to database artifacts would automatically result in undesired changes in the services that are generated based on thereon.

In view of the above context, implementations of the present disclosure are directed to leveraging a data model to provide customization of data schemas and data handling behaviors in services that enable interactions between a web client and a database layer. More particularly, and as describe in further detail herein, implementations of the present disclosure are directed to providing a service upon instantiation of an application, the service being provided based on an entity type definition that is generated based on an API definition. In some implementations, and as described in further detail herein, the entity type definition includes structure defining elements that specify information associated with an underlying data model, and behavior defining elements that define actions executable by the service when accessing the database layer through the data model.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a database layer that is to be accessed through a web client. For example, the web client can be provided on the client device 112, through which a user 112 can interact with the database layer hosted on the server system 104. In further detail, the web client interacts with the database layer through one or more services, which can be provided as OData services (OData RESTful APIs).

Figure 2:
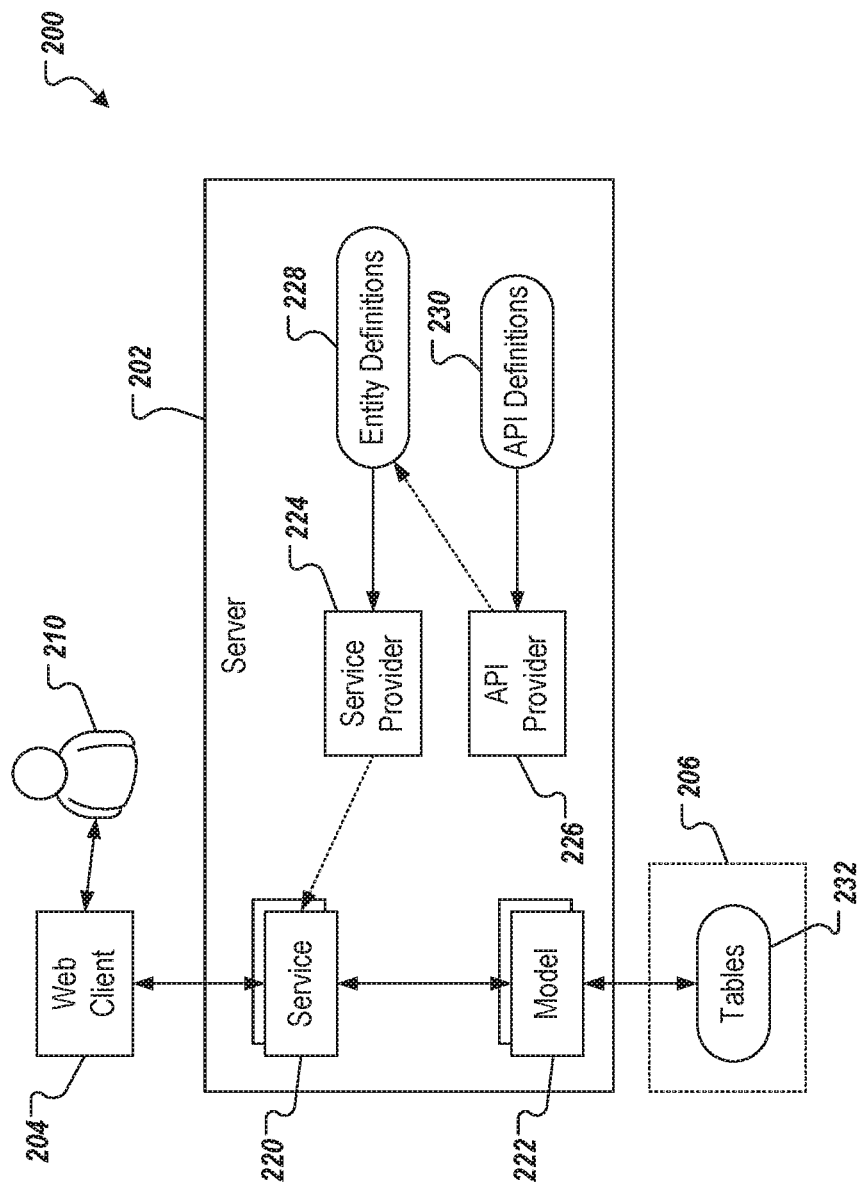
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes a server 202, a web client 204, and a database layer 206. In some examples, the server 202 is provided as a server of a server system (e.g., the server system 104 of FIG. 1). In some examples, the web client is provided by a client device that interacts with the server 202 (e.g., the client device 102 of FIG. 1). In some examples, the database layer 206 is provided separately from the server 202. In some examples, the database layer 206 is provided by the server 202 (e.g., hosted therein).

In the depicted example, the server 202 includes one or more services 220, one or more data models 222, a service provider 224, an API provider 226, an entity definitions store 228, an API definitions store 230. In some examples, each of the one or more services 220 is provided as an OData service (OData RESTful API). In some examples, each model 222 is provided as an ORM model. In some implementations, each service 220 corresponds to a respective data model 222. That is, each service 222 is specific to a data model 222.

The database layer 206 includes one or more database tables 232. In some examples, the web client enables a user 210 to interact with the database layer 232 through a service 220 and a corresponding data model 222. That is, the user 210, for example, can create, modify, and/or delete data stored within the tables 232 of the database layer 206 through the web client 204, a service 220, and a data model 222. For example, the user 210 can issue a query to the database layer 206 through the web client 204.

In some implementations, a web client 204, a service 220, a model 222, and one or more of the tables 232 are associated with an application. For example, an application can provide functionality to perform some end goal. An example application can include, without limitation, a data exchange application that enables data from multiple data sources to be communicated between one another. In some examples, the user 210 can interact with the application through the web client 204 to define a data exchange configuration (e.g., data sources, data transfer end-points, permissions). In some examples, the data exchange configuration is represented as data stored in one or more of the tables 232. It is contemplated, however, that implementations of the present disclosure can be realized with any appropriate application.

In accordance with implementations of the present disclosure, and as described in further detail herein, each service 220 is created during start-up of a respective application (e.g., instantiation of the application). In some implementations, the API provider 226 (e.g., provided as one or more computer-executable programs) loads one or more API definitions from the API definition store 230. For each definition, the API provider 226 runs schema validation checks and, if no schema validity issues are raised, converts the API definition into an entity definition that is stored in the entity definitions store 228. In further detail, the API provider 226 loads the API definitions from a file system based on an API root path that is passed to the API provider 226. In some examples, there are three file types: *.json (JSON-based definitions), *.js (entity-specific event hooks (e.g., pre-commit checks), and *.access files (defining the service-level authorization (i.e., which user type may interact with the service, which is additional to the entity-level authorization checks as defined in the *.json per entity)). The API provider 226 validates the format of the entity definitions based on a JSON schema. For each entity in the API definitions, the API provider 226 retrieves the respective ORM model that contains information, such as data types, model associations, and the like. The API provider 226 builds the entity definitions using the API's entity definition and the ORM model.

In some examples, each entity definition is provided in CSDL. For example, an entity definition is provided as in-memory representation of an OData v4 CSDL Javascript object notation (JSON)-formatted service definition. In some implementations, the entity definitions are consumed by the service provider 224 (e.g., OData service provider), which generates and registers a service 220 for each entity definition. More particularly, the OData services are served, which includes inbound request pre-processing (e.g., URI parsing, (de-)serialization, entity tagging (etag) and batch handling, etc.), and are provided to the service provider by a service library (e.g., an OData V4 Service Library provided by SAP SE of Walldorf, Germany. The OData services are provisioned based on the OASIS OData standard. In some examples, the service library is provided with the service's entity data model in CSDL JSON. Accordingly, the service provider builds the CSDL JSONs from the entity definitions.

During runtime, the application starts to listen to its assigned port and the services 220 can be consumed by users (e.g., the user 210 through the web client 204) and/or other applications.

In further detail, a service (e.g., a service 220 of FIG. 2) includes a set of entity types. In some examples, entity types can reference each other through navigation properties. In accordance with implementations of the present disclosure, each entity type has an individual file (e.g., JSON file) describing it. In some implementations, all files of the entity types that make up a service are located in the same directory. In this manner, multiple services can be provided in parallel (e.g., using separate subdirectories in the same root directory).

In some implementations, an entity type definition includes an entity type, a key, properties, and navigation properties. In some examples, entity types are named structured types with a key. Each entity type defines the properties and relationships of an entity. In some examples, the key of an entity type is formed from a subset of primitive properties (e.g., CustomerId, OrderId, LineId) of the entity type. In some examples, properties declared as part of a definition of a structured entity type are called (declared) properties. In some examples, relationships from one entity to another are represented as navigation properties. In some implementations, the JSON-based entity type definition enables the entity type definition to be specified relative to the underlying ORM model (e.g., a model 222 of FIG. 2). In some implementations, behaviors of the service 220 can also be defined based on the respective entity type.

FIGS. 3A and 3B depict an example pseudo-schema for JSON-based entity type definition in accordance with implementations of the present disclosure. In some implementations, structure defining elements include name, description, model, quota, properties, and navigations. In some examples, name is a name assigned to the entity type. In some examples, description is a description provided for the entity type. In some examples, model identifies the base model (i.e., the name of the ORM model (and, typically, also the name of the database table). In some examples, quota defines the maximum number of entities of the particular entity type that the user may have in their account.

In some examples, properties define the properties of the entity type. In some examples, properties include key and a collection of properties with the respective name of the key of the object. In some examples, key identifies the name of the key property (string or array for entity types with composite keys). In some examples, the collection of properties includes:
    source: the property of the respective model, if exists
    type: the EDM type, if not a property of a model
    description: the description of the property
    i18n: the property shall be handled as language-dependent
    searchable: will be included during a '$search' query
    annotations: OData annotations In some examples, navigations define the navigations of the entity type and includes a collection of navigation properties with the respective name as the key of the object. In some examples, the collection of navigation properties includes:
    target: name of the target entity type
    condition: navigation based on association in the base model, i.e., condition defines cardinality
    description: the description of the navigation property In some implementations, behavior defining elements include restrictions, language, staticInclude, forceInnerJoin, and conditions. In some examples, restrictions define actions that are allowed and under which circumstances an action is allowed. In some examples, language identifies the language, in which the respective action is performed. In some examples, a default is provided and is set to the user locale as defined in HTTP headers. In some examples, staticInclude provides for static joins, for example, if information is needed in result processing. In some examples, forceInnerJoin is provided to convert all outer joins into inner joins. In some examples, conditions define static conditions for the respective action with arbitrary depth. In some examples, first level is joined by AND. In some examples, $and and $or can either be objects (if no duplicate keys, i.e., multiple conditions on the same property) or arrays.

In some examples, the name of the entity type, the properties and the navigations start with an upper-case letter. In some examples, the service in which the entity type lives is taken from the folder that the definition is stored in. In some examples, <String>/<Number>/<Array>/<Object> each depend on the operator used. In some examples, access session/environment variables are provided by a Javascript (JS) template in literal syntax (e.g., ${EMAIL_ADDRESS}).

Figure 4:
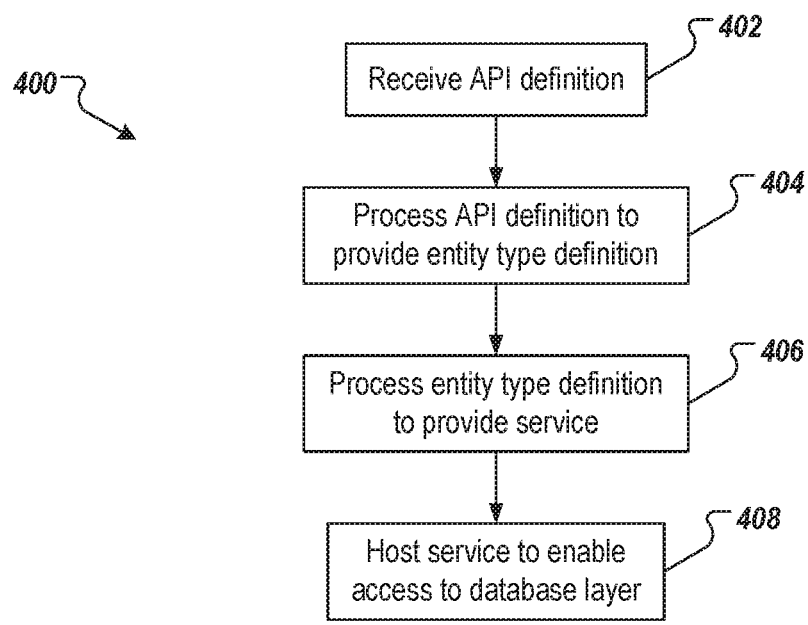
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. The example process 400 is executed to provide one or more services for accessing a database layer through one or more data models.

An API definition is received (402). For example, at instantiation of an application (start-up of a server), the API provider 226 of FIG. 2 receives an API definition. The API definition is processed to provide an entity type definition (404). For example, the API provider 226 processes the API definition to provide the entity type definition. In some examples, processing the API definition to provide the entity type definition includes validating a format of an entity definition provided within the API definition based on a schema (e.g., comparing the format to a schema definition to confirm that the format comports to the schema definition), retrieving the data model for the entity definition, and providing the entity type definition based on the entity definition and the data model. The entity type definition is processed to provide a service (406). For example, the service provider 224 processes the entity type definition to provide the service 220. In some examples, the service provider 224 uses a service library (e.g., OData V4 Service Library) to process the entity type definition to provide the service. The service is hosted to enable access to the database layer (408). For example, the service 220 is hosted on the server 202 and is available to receive queries (e.g., from the web client 204) to enable access to the database layer 206, as described herein.

Figure 5:
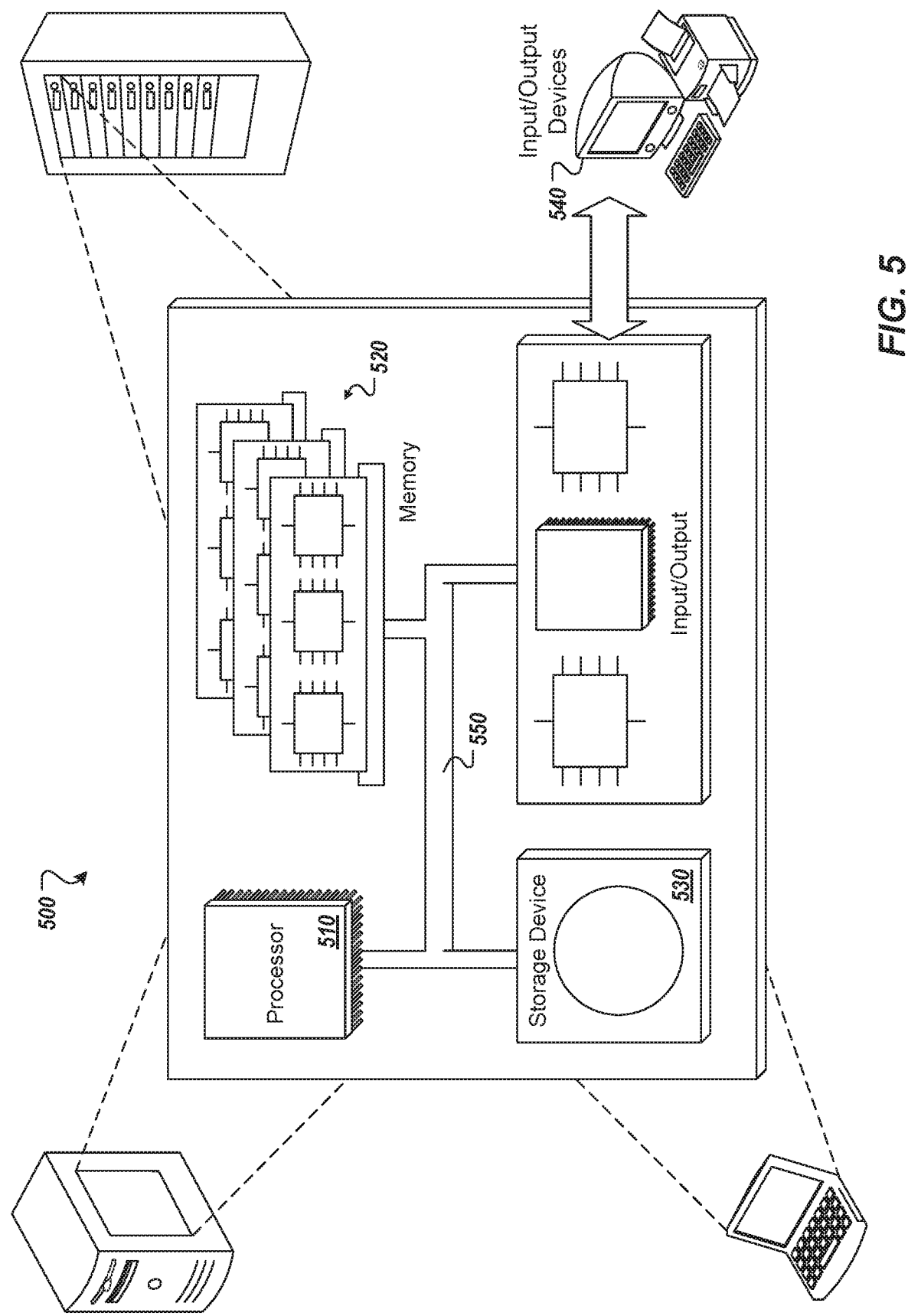
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing one or more services for accessing a database layer through one or more data models, the method being executed by one or more processors and comprising:
   receiving, in response to instantiation of an application that enables access to data within the database layer through a data model, an application programming interface (API) definition provided as a computer-readable file, the API definition being received API definitions store;
   processing the API definition to provide an entity type definition as a computer-readable file, the entity type definition being specific to the data model;
   processing the entity type definition to provide a service that enables access to data within the database layer through the data model during execution of the application; and
   hosting the service to enable access to the data within the database layer based on one or more queries submitted from a web client.

2. The method of claim 1, wherein processing the API definition to provide the entity type definition comprises validating a format of an entity definition provided within the API definition based on a schema, retrieving the data model for the entity definition, and providing the entity type definition based on the entity definition and the data model.

3. The method of claim 1, wherein a service library processes the entity type definition to provide the service.

4. The method of claim 1, wherein the entity type definition comprises structure defining elements that specify information associated with the data model.

5. The method of claim 1, wherein the entity type definition comprises behavior defining elements that define actions executable by the service when accessing the database layer through the data model.

6. The method of claim 1, wherein the service comprises an Open Data Protocol (OData) service provided as a representative state transfer (REST) API.

7. The method of claim 1, wherein the data model comprises an object-relational mapping (ORM) model.

8. A non-transitory computer-readable storage medium coupled to one or more processors and having instructions stored thereon which, when executed by the one or more processors, cause the one or more processors to perform operations for natural language explanations for providing one or more services for accessing a database layer through one or more data models, the operations comprising:
   receiving, in response to instantiation of an application that enables access to data within the database layer through a data model, an application programming interface (API) definition provided as a computer-readable file, the API definition being received API definitions store;
   processing the API definition to provide an entity type definition as a computer-readable file, the entity type definition being specific to the data model;
   processing the entity type definition to provide a service that enables access to data within the database layer through the data model during execution of the application; and
   hosting the service to enable access to the data within the database layer based on one or more queries submitted from a web client.

9. The computer-readable storage medium of claim 8, wherein processing the API definition to provide the entity type definition comprises validating a format of an entity definition provided within the API definition based on a schema, retrieving the data model for the entity definition, and providing the entity type definition based on the entity definition and the data model.

10. The computer-readable storage medium of claim 8, wherein a service library processes the entity type definition to provide the service.

11. The computer-readable storage medium of claim 8, wherein the entity type definition comprises structure defining elements that specify information associated with the data model.

12. The computer-readable storage medium of claim 8, wherein the entity type definition comprises behavior defining elements that define actions executable by the service when accessing the database layer through the data model.

13. The computer-readable storage medium of claim 8, wherein the service comprises an Open Data Protocol (OData) service provided as a representative state transfer (REST) API.

14. The computer-readable storage medium of claim 8, wherein the data model comprises an object-relational mapping (ORM) model.

15. A system, comprising:
   a computing device; and
   a computer-readable storage device coupled to the computing device and having instructions stored thereon which, when executed by the computing device, cause the computing device to perform operations for providing one or more services for accessing a database layer through one or more data models, the operations comprising:
- receiving, in response to instantiation of an application that enables access to data within the database layer through a data model, an application programming interface (API) definition provided as a computer-readable file, the API definition being received API definitions store;
- processing the API definition to provide an entity type definition as a computer-readable file, the entity type definition being specific to the data model;
- processing the entity type definition to provide a service that enables access to data within the database layer through the data model during execution of the application; and
- hosting the service to enable access to the data within the database layer based on one or more queries submitted from a web client.

16. The system of claim 15, wherein processing the API definition to provide the entity type definition comprises validating a format of an entity definition provided within the API definition based on a schema, retrieving the data model for the entity definition, and providing the entity type definition based on the entity definition and the data model.

17. The system of claim 15, wherein a service library processes the entity type definition to provide the service.

18. The system of claim 15, wherein the entity type definition comprises structure defining elements that specify information associated with the data model.

19. The system of claim 15, wherein the entity type definition comprises behavior defining elements that define actions executable by the service when accessing the database layer through the data model.

20. The system of claim 15, wherein the service comprises an Open Data Protocol (OData) service provided as a representative state transfer (REST) API.

* * * * *